United States Patent [19]

Shimizu et al.

[11] Patent Number: 4,693,942
[45] Date of Patent: Sep. 15, 1987

[54] APEX SEAL FOR ROTARY PISTON ENGINES

[75] Inventors: Tsutomu Shimizu, Higashi-Hiroshima; Jun Miyata; Koji Yagii, both of Hiroshima, Japan

[73] Assignee: Mazda Motor Corporation, Hiroshima, Japan

[21] Appl. No.: 816,834

[22] Filed: Jan. 7, 1986

[30] Foreign Application Priority Data

Jan. 14, 1985 [JP] Japan .................................. 60-4610

[51] Int. Cl.$^4$ ...................... B32B 15/00; F01C 21/08
[52] U.S. Cl. .................................... 428/614; 428/679; 418/178; 418/179
[58] Field of Search ...................... 418/113, 178, 179; 428/547, 558, 562, 610, 614, 679, 937, 682; 148/31.5, 39; 420/435

[56] References Cited

U.S. PATENT DOCUMENTS

| 3,180,012 | 4/1965 | Smith | 420/435 |
| 3,841,724 | 10/1974 | Culabrese | 418/179 |
| 3,938,814 | 2/1976 | Cromwell | 428/937 |
| 4,212,900 | 7/1986 | Serlin | 148/39 |
| 4,232,094 | 11/1980 | Rhodes et al. | 428/937 |
| 4,409,298 | 10/1983 | Abertson et al. | 428/614 |
| 4,532,191 | 7/1985 | Humphries et al. | 428/679 |
| 4,537,167 | 8/1985 | Eudier et al. | 428/547 |

FOREIGN PATENT DOCUMENTS

| 883221 | 10/1971 | Canada | 420/435 |
| 48-25290 | 7/1973 | Japan . | |
| 49-30895 | 8/1974 | Japan . | |
| 35889 | 9/1978 | Japan | 428/679 |

OTHER PUBLICATIONS

Price et al, Chem. Abs. 88:124933t, "Some Comparative Properties of Laves . . . ", 1978.
Manolache et al., Chem. Abs. 46:185343n, "Effect of Sintering Comparative . . . , Tribaloy", 1981.
Halstead et al, Chem. Abs. 103:41031z, "The Effect of Iron Additions . . . Tribaloy . . . ", 1985.

Primary Examiner—L. DeWayne Rutledge
Assistant Examiner—John J. Zimmerman
Attorney, Agent, or Firm—Fleit, Jacobson, Cohn & Price

[57] ABSTRACT

A method for manufacturing an apex seal for rotary piston engines, comprising steps of providing a substrate made of an iron based material and having a portion wherein a sliding surface is provided, spraying the portion of the substrate with a molten-state Co-Mo-Si type intermetallic compound to form a coating of the compound, heating the coating of the compound by applying electron beams or laser beams to thereby make the intermetal compound dispersed in the substrate, heating the substrate to 580° to 780° C. to anneal it and machining the substrate into a configuration of the apex seal. The apex seal made in accordance with this method is also disclosed.

2 Claims, 3 Drawing Figures (X 100)

(X 100)

(X 100)

(X 100)

APEX SEAL FOR ROTARY PISTON ENGINES

BACKGROUND OF THE INVENTION

1. Field of the Invention

The present invention relates to an apex seal for rotary piston engines. More particularly, the present invention, pertains to an apex seal made of an iron-based material.

2. Description of Prior Art

In rotary piston engines, working chambers are separated from each other by means of side seals provided on side surfaces of rotors and apex seals provided on apex portions of the rotors. Among these seals, the apex seals are slidably moved at very high speeds along the inner wall surfaces of the rotor housings and besides they are also subjected to influences of combustion gas pressure, inertia force and spring force which tend to force strongly the apex seals against the inner wall surfaces of the rotor housings. Thus, the apex seals are required to have superior wear-resistant property.

Conventional rotary piston engines use apex seals which are prepared in accordance with the process as taught by Japanese patent publication No. 48-25290 published on July 27, 1973. According to the teachings by the Japanese patent publication, a cast iron blank is subjected to an electron beam embodiment to have a part of the blank material molten and thereafter the blank is quenched so that the molten material is solidified. In the course of solidification, a chilled structure is formed due to the chilling effect of the part of the blank where the material is not molten. It has been proved that the apex seal formed under this process has a good wear-resistant property. It should however be noted that the hardness and therefore the wear-resistant property of this material decreases under a high temperature. In view of the fact that recent high power rotary piston engines are operated under a high speed and high output power so that the conventional apex seals show insufficient wear resistant property for such high power rotary piston engines.

Japanese patent publication No. 49-30895 discloses on alloy having a high wear-resistant property. This alloy has a hard matrix metal containing hard inter-metal compounds dispersed in the matrix metal for providing an improved wear-resistant property. However, this type of material is not suitable for apex seals of rotary piston engines because the material has a poor thermal shock resistance so that apex seals made of this material are apt to produce cracks when they are subjected to repeated heating and cooling.

SUMMARY OF THE INVENTION

It is therefore an object of the present invention to provide apex seals for rotary piston engines, which have a high wear-resistant property and a high thermal shock resistance.

Another object of the present invention is to provide apex seals which are suitable for use with high power rotary piston engines.

According to the present invention, the above and other objects can be accomplished by an apex seal for rotary piston engines comprising a substrate of an iron-based material having a sliding surface portion containing a matrix of Co-Mo-Si-Fe type alloy and Co-Mo-Si type intermetallic compound dispersed in the matrix in an amount of 25 to 60 vol. %, said matrix containing less than 25 weight % of Fe. The substrate may be made of a cast iron as in the conventional apex seal.

Typically, the Co-Mo-Si type intermetal alloy may be the one which is disclosed by the aforementioned Japanese patent publication No. 49-30895. Such alloy is commercially available from E, I, Du Pont de Nemours and Company Inc. under the trademark "TRIVALLOY". Table I shows a list of series of TRIVALLOY available in the market.

TABLE I

| TYPE | COMPOSITION (weight %) | | | | |
|------|----|----|----|----|----|
|      | Co | Ni | Mo | Cr | Si |
| T-100 | 55 | — | 35 | — | 10 |
| T-400 | 62 | — | 28 | 8 | 2 |
| T-700 | — | 50 | 32 | 15 | 3 |
| T-800 | 52 | — | 28 | 17 | 3 |

According to the present invention, the Co-Mo-Si type intermetallic compound is dispersed in the matrix of Co-Mo-Si-Fe type alloy in an amount of 25 to 60 vol. %. With the intermetal alloy content less than 25 vol. %, the wear-resistant property is insufficient. It is impossible to manufacture a material containing more than 60 vol. % of the intermetal compound.

According to a further feature of the present invention, the Fe content in the matrix is less than 25 weight %. With the Fe content greater than 25 weight %, the wear-resistant property becomes insufficient. There is no limitation in the thickness of the sliding surface portion, however, a practically preferable thickness is 1.5 to 3.5 mm.

The apex seal of the present invention can be manufactured in accordance with the following procedures. A substrate of an iron based material is at first prepared and sprayed at a surface with a molten Co-Mo-Si type intermetallic compound, preferably in an amount of 0.5 to 2.5 g/cm². Thereafter, the coating of the intermetallic compound is heated by applying electron beams or laser beams so that the Co-Mo-Si type intermetallic compound is dispersed in the substrate. Then, the substrate is annealed under a temperature of 580° to 780° C. and finally machined.

The invention will now be described with reference to specific examples taking reference to the accompanying drawings.

EXAMPLES

An apex seal substrate of 70 mm long, 10 mm high and 3 mm thick is prepared in a conventional manner from a cast iron and spray at a sliding surface portion with a molten T-100 TRIVALLOY alloy in an amount of 0.3 to 3.0 g/cm². Thereafter, the sprayed coating of the alloy is subjected to a treatment by electron beams under the accelerating voltage 30 KV and the beam current 55 mA and the substrate is then annealed under 530° to 880° C. Then, the substrate is machined to a configuration of an apex seal of 70 mm long, 8 mm high and 3 mm thick.

The apex seal thus formed is then subjected to wear and thermal impact tests with the following test conditions.

Wear Test (Slider Type Wear Test)
  Lubrication: Dry
  Sliding Surface: Cr plated surface having a hardness of Hv 1000 to 1200
  Sliding Speed: 5 m/sec.
  Test Time: 20 min.
  Depressing Load: 4.5 kg
Thermal Impact Test
  Cycles of heating to 380° C. and then water quenching have been repeated for 20 times and investigated for presence of cracks.

cessively high. The sample S10 contains an excessive amount of Fe due to an excessive dilution of the alloy by the substrate material.

Figure 1:
FIGS. 1 and 2 are microscopic pictures showing examples of the present invention; and, FIG. 3 is a microscopic picture of a comparative example.
Figure 2:
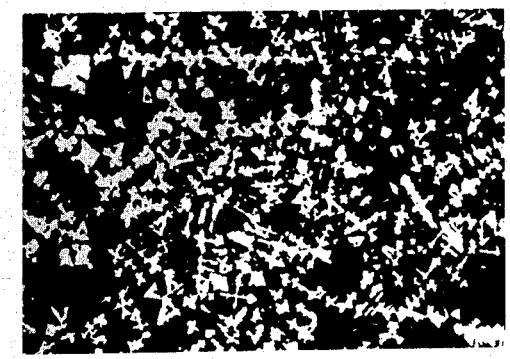
Figure 3:
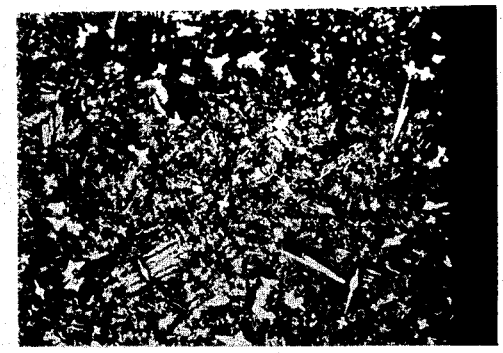

Referring to FIGS. 1 through 3 which show the microscopic structure of the samples S2, S3 and S6, respectively, the whitish areas designate the intermetal alloy of Co-Mo-Si type. It will be noted in these figures that the volumetric content of the intermetal alloy is the highest in the sample S3 and the lowest in the sample S6. It will further be noted in the Table II that the apex seal of the present invention has superior wear-resistant

TABLE II

| SAMPLES | SPRAY (g/cm$^2$) | ANNEAL TEMP. (°C.) | Co—Mo—Si TYPE INTERMETAL (Vol. %) | Fe CONTENT (weight %) | THICKNESS OF ALLOY LAYER (MM) | WEAR (μ) | CRACK OCCURANCE (%) | REMARKS |
| --- | --- | --- | --- | --- | --- | --- | --- | --- |
| S1 | 0.5 | 580 | | | | 31 | 10 | INVENTION |
| S2 | 1.5 | 580 | 25 | 23.5 | 2.0 | 25 | 14 | INVENTION |
| S3 | 2.5 | 580 | 45 | 13.0 | 2.0 | 14 | 19 | INVENTION |
| S4 | 0.5 | 780 | | | | 50 | 4 | INVENTION |
| S5 | 2.5 | 780 | | | | 32 | 15 | INVENTION |
| S6 | 0.3 | 580 | 10 | 20.4 | 2.0 | 65 | 8 | COMPARATIVE EXAMPLE |
| S7 | 3.0 | 780 | | | | — | — | COMPARATIVE EXAMPLE |
| S8 | 0.5 | 530 | | | | 34 | 21 | COMPARATIVE EXAMPLE |
| S9 | 2.5 | 880 | | | | 72 | 10 | COMPARATIVE EXAMPLE |
| S10 | 2.5 | 680 | 25 | 30.0 | 3.0 | 72 | 12 | COMPARATIVE EXAMPLE |
| S11 | | | | | | 82 | 5 | PRIOR ART |
| ALLOWABLE LIMITED | | | | | | LESS THAN 60μ | LESS THAN 20% | |

In the Table II, the samples S1 through S5 are embodiments of the present invention and all of these samples meet the requirements. It will be noted in Table II that under the same annealing temperature the wear decreases as the spray quantity increases but the crack occurence increased instead. This is understood as being caused by the fact that the TRIVALLOY alloy is diluted in less amount as the spray quantity increases. Under the same spray quantity, the crack occurence decreases as the annealing temperature increases but the wear increases instead. This is understood as being caused by the fact that the material of the substrate which has been mixed with the TRIVALLOY alloy during the electron beam treatment is softened in the annealing.

The samples S6 through S10 are prepared by processes similar to those wherein the samples S1 through S5 are prepared. The sample S6 shows an excessive wear due to insufficiency of the spray quantity. The sample S7 has an excessive spray quantity so that it is impossible to machine into a configuration of an apex seal. The sample S8 shows an insufficient resistance to thermal shock since the annealing temperature is insufficient. The sample S9 is dissatisfactory in respect of the wear resistance since the annealing temperature is excessively high. property and thermal shock resistance.

The invention has thus been shown and described with reference to specific examples, however, it should be noted that the invention is in no way limited to the details of the described examples but changes and modifications may be made without departing from the scope of the appended claims.

What is claimed is:

1. An apex seal for rotary piston engines comprising a substrate of an iron-based material having a sliding surface portion having a thickness of 1.5 to 3.5 mm, said sliding surface portion being formed by dispersing a Co-Mo-Si intermetallic compound into an iron-based material to produce a matrix of Co-Mo-Si-Fe alloy formed by Fe content in the iron-based material which is molten when the Co-Mo-Si intermetallic compound is dispersed in the iron-based material and the Co-Mo-Si intermetallic compound dispersed in the matrix in an amount of 25 to 60 vol. %, said matrix containing less than 25 weight % of Fe.

2. An apex seal in accordance with claim 1 in which said Co-Mo-Si type intermetal compound contains in weight 55% of Co, 35% of Mo and 10% of Si.

* * * * *